Figure 4:
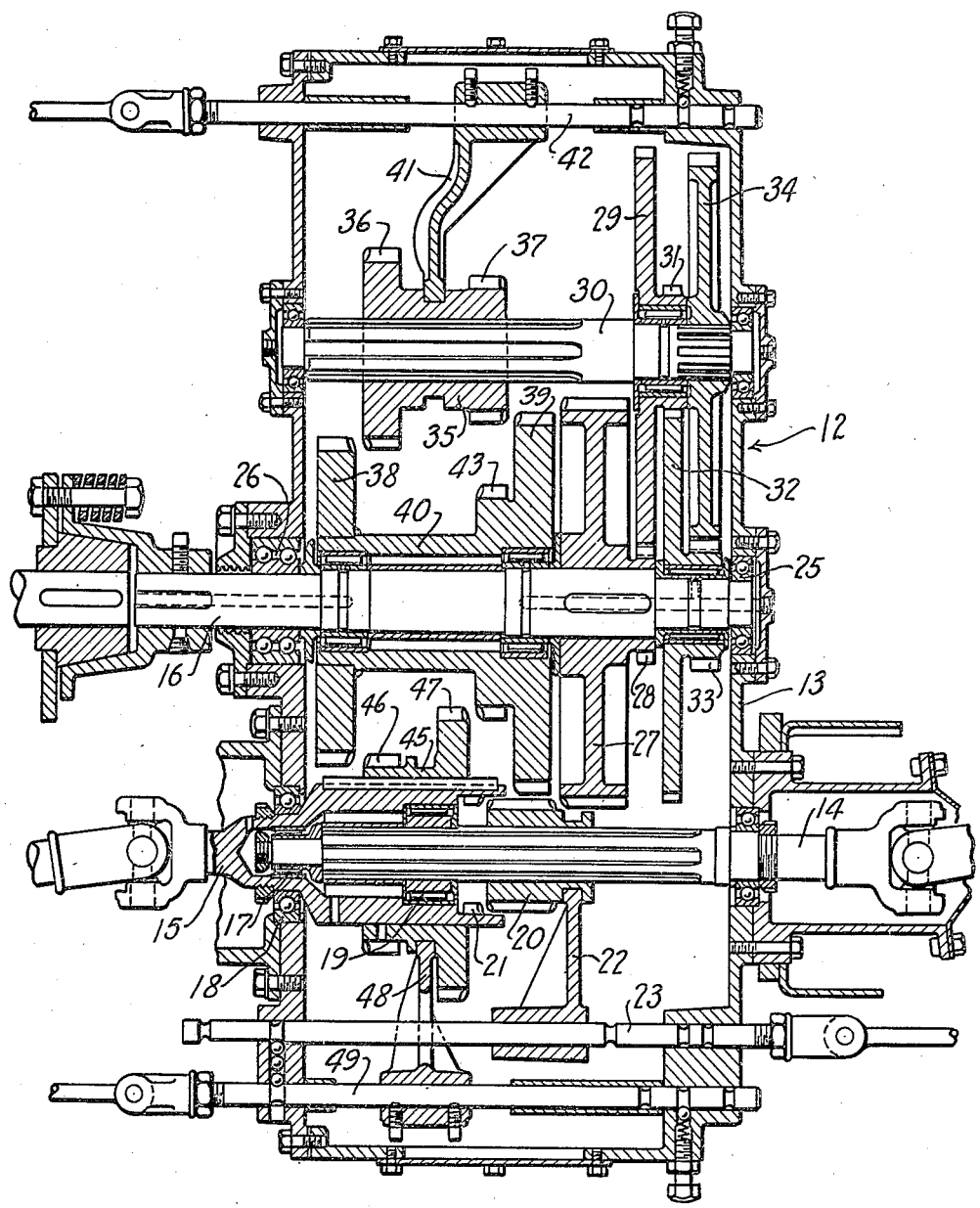

June 22, 1937.  R. N. BENNETT  2,084,887
POWER TRANSMISSION MEANS
Filed March 23, 1936  2 Sheets-Sheet 1
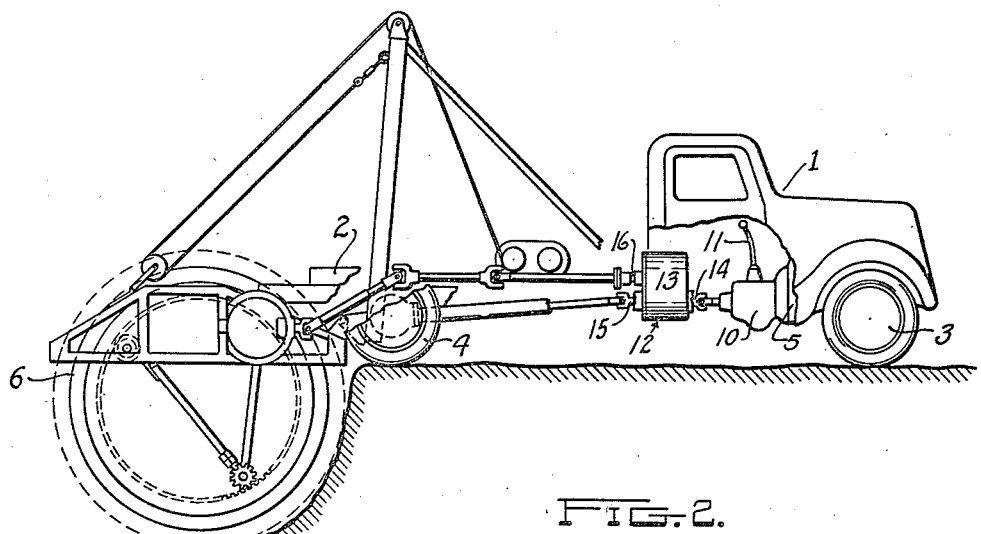
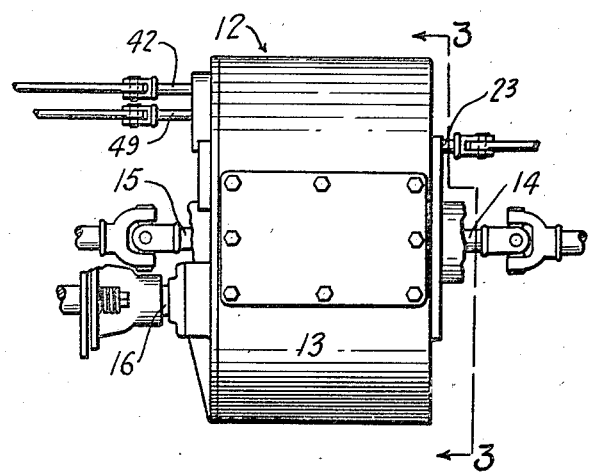
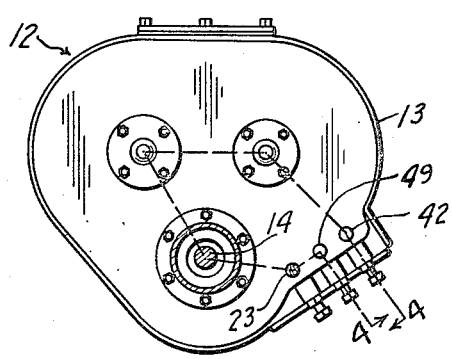
Inventor
Robert N. Bennett,
By Owen & Owen,
Attorneys June 22, 1937. R. N. BENNETT 2,084,887
POWER TRANSMISSION MEANS
Filed March 23, 1936 2 Sheets-Sheet 2

Inventor
Robert N. Bennett,
By Owen & Owen,
Attorneys.

Patented June 22, 1937

2,084,887

UNITED STATES PATENT OFFICE 2,084,887

POWER TRANSMISSION MEANS

Robert N. Bennett, Findlay, Ohio, assignor to The Buckeye Traction Ditcher Company, Findlay, Ohio, a corporation of Ohio Application March 23, 1936, Serial No. 70,245

3 Claims. (Cl. 74—389)

This invention relates to power transmission means of the variable speed type, and particularly to such means adapted for use in a tractor type excavating machine, wherein power from a common source may be selectively distributed at variable speeds to both the digging and the traction means of the machine.

The primary object of the invention is the provision of a simple, novel and efficient power transmission of the character described.

A further object of the invention is the provision of a novel power transmission unit having a single power source and a double power output, together with a variable speed control for at least one output.

A further object of the invention is the provision in combination with a power shaft, having a variable speed control, of two driven shafts, together with power transmission means controllable to transmit power to either or both of the driven shafts from the power shaft to render the speed of at least one of said driven shafts variable with respect to the speed of driving of the power shaft.

Further objects and advantages of the invention will be apparent from the following detailed description and from the accompanying drawings illustrating one embodiment of the invention, in which—

Figure 1 is a side elevation of a machine embodying the invention, with parts broken away and with the excavating wheel shown partly in dotted lines and lowered in digging position; Fig. 2 is a top plan view of the multiple power transmission unit of the machine with parts projecting therefrom; Fig. 3 is a section on the line 3—3 in Fig. 2, and Fig. 4 is a developed sectional arrangement of the multiple power transmission unit such as would appear by an enlargement and straightening out of a section taken on the line 4—4 in Fig. 3, so that the several shafts of the unit lie in a common plane.

Referring to the drawings, I designates a tractor unit of the motor truck type having a frame 2 supported by the front steering wheels 3 and by rear traction wheels 4, and having a power unit 5. An excavating means 6, in the present instance of the wheel type, is carried at the rear end of the tractor frame and both this means and the traction wheels 4 receive their power from the power unit 5 through a suitable selectively controlled power transmission mechanism in which the present invention resides.

This power transmission mechanism includes the variable transmission unit 10 commonly used in connection with the power transmissions of tractors of the truck or automobile type and having a control lever 11, and also includes a second power transmission unit 12 by which the power to drive the traction wheels and excavating means is separately controlled.

The unit 12 has a casing 13 and includes a drive shaft 14 receiving its power through a flexible connection with the unit 10, a driven shaft 15 having suitable driving connection with the traction wheels 4 and a second driven shaft 16 having suitable driving connection with the excavating means 6.

The drive shaft 14 and driven shaft 15 are journaled in axially aligned relation in opposite sides of the casing 13 and the inner end of the shaft 15 is enlarged and of cylindrical form within the casing 13 to receive and form a bearing for the adjacent end of the shaft 14. In the present instance, the shaft 14 has a bearing 17 in the shaft 15 in the plane of the shaft bearing 18, as well as an additional bearing 19 between such shafts in inwardly spaced relation to the inner end of the shaft 15. The shaft 14 has a drive pinion 20 splined thereon and shiftable in one direction in mesh with internal teeth 21 in the adjacent end of the shaft 15 to permit a direct connection and rotation in unison of the shafts 14 and 15. The pinion 20 is engaged by a shipper arm 22 carried by a rod 23 which is mounted for longitudinal reciprocatory movements in the casing 13 and has connection at one end with any suitable control (not shown).

The driven shaft 16 is disposed in offset parallel relation to the shafts 14 and 15, being journaled in bearings 25 and 26 in the casing 13. A large gear 27 is fixed on the shaft 16 near its forward end, in the present instance, and in position to mesh with the drive pinion 20 when the latter is shifted forwardly from its neutral position shown in Fig. 4, so that such gear and the shaft 16 may be driven at a reduced speed from the shaft 14.

A small pinion 28 is formed on or fixedly connected to the hub gear 27 and drives a gear 29 mounted loosely on a back shaft 30 journaled at its ends in the front and rear sides of the casing 13 parallel to the shaft 16. A small pinion 31, fixed on the hub of the gear 29, meshes with and drives a gear 32 mounted loosely on the shaft 16 and has a pinion 33 on its hub which meshes with and drives a gear 34 fixed on the shaft 30. It is thus apparent that the shaft 30 is driven at very much reduced speed from the gear 27 on the shaft 16 when the drive pinion 20 is in mesh with such gear.

A sleeve 35 having fixed to it two pinions 36 and 37 of different sizes, is splined for axially shifting movements on the shaft 30 to place said pinions respectively into or out of meshing engagement with pinions 38 and 39 on the shaft 16. These latter pinions are fixed in axially spaced relation on a sleeve 40, which is mounted for free rotation on the shaft 16. The sleeve 35 is engaged by a shipper arm 41 carried by a rod 42, which is reciprocably mounted in bearings in the casing 13 and is in connection with a suitable control (not shown). The sleeve 40 also fixedly carries a pinion 43 which is smaller than either of the pinions 38 and 39.

A sleeve 45 is splined on the enlarged cylindrical portion of the shaft 15 within the casing 13 and carries two pinions 46 and 47 of different size. This sleeve may be shifted to engage either the pinions 38 and 46 or the pinions 43 and 47. It is thus apparent that four different slower speeds can be communicated to the driven or traction shaft 15 from the drive shaft 14 when the shaft 16 is being driven for excavating purposes. This enables the speed of advancing movement of the machine to be regulated to suit the digging conditions while the driving of the excavating means may remain constant, except that if desired it may be varied by a change in the speed of driving of the shaft 14 through a manipulation of the gears in the main power transmission unit 10. The shaft 16 may also be driven with the drive shaft 14 entirely disconnected from the shaft 15, so that if desired the excavating means can be operated without any advancing of the machine.

The sleeve 45 is engaged by a shipper arm 48 carried by a rod 49 which is mounted for reciprocatory movements in the casing wall and is connected to any suitable control (not shown).

It is apparent in the use of this machine that when it is being used for excavating purposes, the drive pinion 20 is placed in engagement with the gear 27 to effect a driving of the excavating means through the shaft 16. The speed of driving of such means may be varied by a desired shifting of the gears in the main power transmission 10 of the truck. In order to advance the machine while excavating, the shipper rods 42 and 49 are operated to place the desired reduced speed gear train combination in operative connection between the shaft 16 and traction shaft 15. In this manner, the machine can be caused to just creep along during the digging operation or to move at several faster speeds without effecting the speed of driving of the excavating means. When the machine is being transported from place to place, it may be driven at the customary drive speeds of a truck for which the main transmission unit 10 may be adapted. During such drive, the drive gear 20 in the auxiliary transmission unit 12 is placed in engagement with the teeth 21 on the traction shaft 15, so that the shafts 14 and 15 are directly connected for rotation together at the same speed.

It is apparent from the foregoing that the machine employs main and auxiliary power transmission units with the auxiliary unit inoperative or disconnected when the machine is being transported from place to place and when a digging operation is not taking place, and that when such digging operation is taking place, power is communicated to the digging means at preferably a reduced speed from the main power transmission means and that during the digging operation one or more speeds of a slower nature than those for which the main power transmission means is adapted is communicated to the traction means of the machine.

I wish it understood that my invention is not limited to any specific construction, form or arrangement of the parts, as it is capable of numerous modifications and changes without departing from the spirit of the claims.

Having thus described my invention, what I claim as new, and desire to secure by United States Letters Patent, is:

1. In a power transmission means, a drive shaft, first and second output shafts, said last two shafts having portions mounted in parallel relation to each other and said drive and first shafts being axially aligned, a gear in driving connection with said second shaft, a drive pinion splined on the drive shaft and shiftable from neutral position into direct driving engagement with said first shaft or with said gear, a back shaft in parallel offset relation to said shafts, a reduced speed driving connection between said gear and back shaft, a sleeve mounted for free rotation on said second shaft and having a plurality of pinions of varying sizes, means for selectively connecting the back shaft to certain of the pinions on said sleeve, and means operable to selectively connect certain of the pinions on said sleeve to said first shaft.

2. In a power transmission means, a drive shaft, first and second output shafts and a back shaft, the last three being mounted in parallel relation and said drive and first shafts being axially aligned, a gear in driving connection with said second shaft, a drive pinion splined on the drive shaft and shiftable from neutral position into direct driving engagement with said first shaft or with said gear, a multiple gear speed reduction connection between said second and back shafts, and a variable speed connection between said back shaft and said first shaft and including a plurality of gears loosely mounted on said second shaft, a plurality of pinions each on said back shaft and first shaft selectively shiftable into and out of engagement with certain of the loose gears on said second shaft whereby a variable slow drive may be imparted to said first shaft while a constant drive at a different speed is imparted to said second shaft from the drive shaft.

3. In a power transmission means, a drive shaft, first and second output shafts and a back shaft, the last three being mounted in parallel relation and said drive and first shafts being axially aligned, a gear fixed to said second shaft, a drive pinion splined on the drive shaft and shiftable from neutral position into direct driving engagement with said first shaft or with said gear, a multiple gear speed reduction train connecting said second and back shafts with certain of the gears loose on each of such shafts, three pinions of different sizes loosely mounted on said second shaft, a pair of shiftable pinions on said back shaft for selective engagement with two of the pinions on the second shaft, and a pair of pinions shiftable on said first shaft for selective engagement with two of the loose pinions on said second shaft whereby a variable reduced speed may be imparted to the first shaft from the drive shaft while the second shaft is driven at a constant speed which is slower than the speed of the drive shaft.

ROBERT N. BENNETT.